Feb. 13, 1923.
H. H. MERCER.
ROTATING MECHANISM.
FILED APR. 25, 1919.
1,445,151.
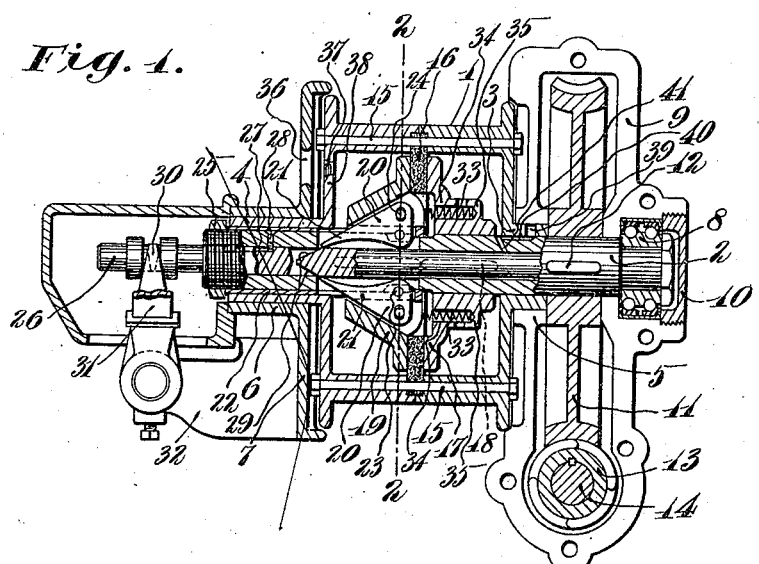
Fig. 1.
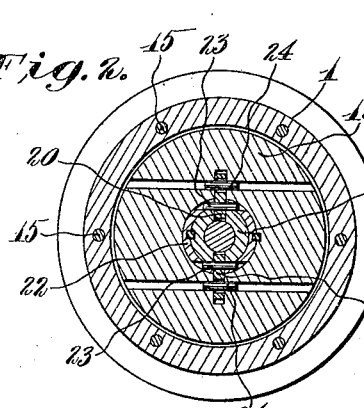
Fig. 2.
Fig. 3.
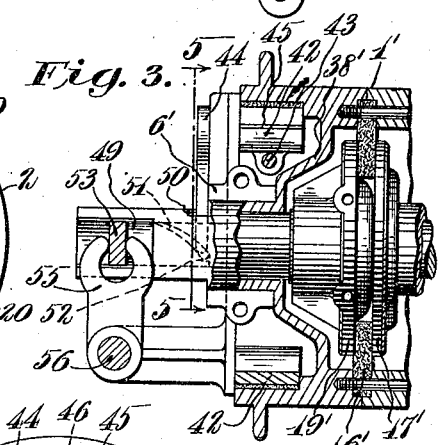
Fig. 5.
Fig. 4.
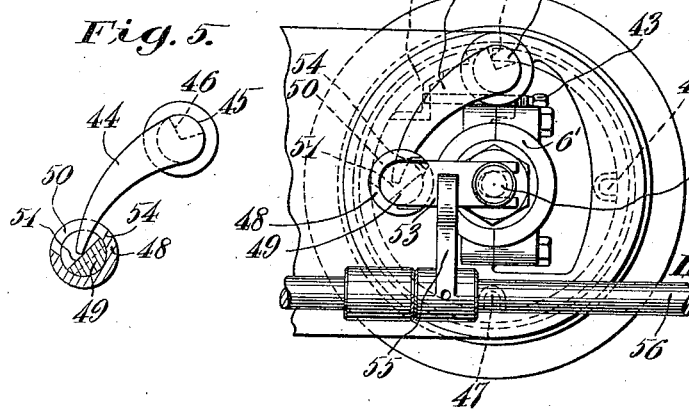
Inventor:
Henry H. Mercer
by
Atty.

Patented Feb. 13, 1923.

1,445,151

UNITED STATES PATENT OFFICE.

HENRY H. MERCER, OF CLAREMONT, NEW HAMPSHIRE, ASSIGNOR TO SULLIVAN MACHINERY COMPANY, A CORPORATION OF MASSACHUSETTS.

ROTATING MECHANISM.

Application filed April 25, 1919. Serial No. 292,633.

*To all whom it may concern:*

Be it known that I, HENRY H. MERCER, a citizen of the United States, residing at Claremont, in the county of Sullivan and State of New Hampshire, have invented certain new and useful Improvements in Rotating Mechanisms, of which the following is a full, clear, and exact specification.

My invention relates to rotating mechanisms and more especially though not exclusively to a type of rotating mechanism adapted for driving drums, belt wheels, or the like.

One object of the present invention is to provide an improved rotating mechanism. Another object of the present invention is to provide an improved rotating mechanism composed of a few simple parts arranged compactly and having also an improved controlling means. These and other objects and advantages of my improved construction will, however, hereinafter more fully appear.

In the accompanying drawings I have shown for purposes of illustration several embodiments which my invention may assume in practice.

In these drawings,—

Fig. 1 is a longitudinal sectional view of my improved rotating device.

Fig. 2 is a transverse sectional view on the line 2—2 Fig. 1.

Fig. 3 is a partial longitudinal sectional view of a modified form, parts thereof being removed to faciliate illustration.

Fig. 4 is an end elevation thereof.

Fig. 5 is a partial detail sectional view of a part of the controlling means taken substantially on the line 5—5 of Fig. 3.

In the form of my invention illustrated in Figs. 1 and 2, I have shown an element to be rotated, this element being shown as a drum 1 mounted for rotation on and independently of a hollow axle 2.

As shown the drum has bearings 3 and 4 in which the axle turns when the drum is not rotating, the bearing 3 being supported in a cooperating bearing 5 of a gear housing and the bearing 4 being supported in a cooperating bearing 6 of a frame member 7 which supports one end of the rotating mechanism. The shaft 2 is also preferably provided with a thrust bearing 8 herein shown as placed between one end of the shaft 2 and a part of the housing 9 of the driving gear, the opening in the housing through which the thrust bearing is assembled being preferably closed by a plug 10. In the form shown the driving axle 2 is also preferably rotated by a large worm gear 11 splined to the shaft, as shown at 12, the gear 11 with the cooperating worm 13 being mounted in the gear housing 9, and the worm being driven by a driving shaft 14 which may be rotated by any suitable means as a motor, not shown.

The drum 1 is preferably made of a plurality of parts secured together by a number of bolts 15, these parts holding between them a fibre or other friction disc 16 which serves as one element of a clutch, the other elements comprising preferably a member 17 fixed to the shaft 2 as by means of a keyway 18 and a movable clutch member 19 adapted to bind the clutch element 16 between the clutch elements 17 and 19 by movement of the latter and thereby produce a rotation of the drum. As is obvious, a number of means may be employed for controlling the clutch element 19 but in the form herein shown, I preferably use a plurality of bell crank levers 20 having arms 21 projecting therefrom, these levers being preferably attached to an adjusting sleeve 22 by means of pins 23 and to the clutch element 19 by means of pins 24 the construction being such that when the adjusting nut 25 is advanced on the axle 2 on which it is threaded, the sleeve 22 is forced inward to adjust the element 19 in closer relationship to the clutch element 16.

As is clearly shown in Fig. 1, the clutch may be thrown into engagement by moving the ends of the lever arms 21 outwardly to force the clutch member 19 to the right, and for this purpose I preferably provide a controlling rod 26 extending axially through the hollow axle 2 and being attached thereto for rotative movement therewith by means of a slot 27 and a cooperating pin 28. The lever arms 21 are actuated into engaging position by a plurality of preferably oppositely disposed inclined surfaces 29 formed in the controlling rod 26, it being obvious that when the controlling rod is forced to the right as by means of a shipper yoke 30 and a manually operated handle 31 connected therewith, these parts being supported preferably on a bracket 32, the ends of the lever arms 21 will fall into the recesses formed in the controlling arm and the clutch will be disengaged. If the velocity of rotation of the drum is relatively small, no supplemental means will be required to operate the levers to disengage the clutch elements, but if these clutch elements should tend to stick or if, due to a high speed of rotation, centrifugal force tends to engage the clutch elements, a plurality of springs such as shown at 33 may be used to normally force the parts to a disengaged position. As shown these springs pass through small holes 34 in the clutch element 17 and abut against suitable abutments 35 preferably carried by the hub of this clutch element.

The moving parts of the rotating mechanism are preferably automatically lubricated as by a lubricant which may be carried within the hollow drum 1, the lubricant being introduced into this drum through a slot 36 in the reel frame and an opening 37 in a supporting web 38 of the drum, this opening being normally closed by a pipe plug as shown. This lubricant flows freely to all parts of the apparatus, and to facilitate the free movement of the lubricant, passageways 39, 40, and 41 are formed in the axle or the drum, the lubricant being free to pass from the left hand side of the drum to the right hand side thereof through the openings 34.

In this form of my invention if the gear wheel 11 can be rotated at will in opposite directions or held stationary, the clutch controlling handle 31 may be operated to control the movement of the drum in either direction or to brake the latter. If the worm gear 11, however, is constantly driven in one direction, the drum may be operated to wind a cable thereon by throwing the clutch into engagement or the drum may be permitted to rotate at any desired speed in the opposite direction by slipping the clutch, it being apparent that the clutch may be slipped in such a manner that it brakes the movement of the drum in this direction.

In the form of my invention shown in Figs. 3, 4, and 5, the drum and the drum rotating mechanism are substantially the same as shown in Figs. 1 and 2 with the exception that the web 38 of the drum shown in Fig. 1 is preferably formed within the drum 1' as shown at 38' so as to provide a space for a braking mechanism within the periphery of the drum. Also to facilitate assembly of the drum, the bearing 6 is formed of a plurality of parts as shown at 6' which may be bolted together after the drum has been placed in position.

The braking mechanism preferably consists of an expansible ring 42 having one end held in a fixed position by an adjusting screw 43, the other end being operated to expand the ring by a dog arm 44 and a dog shaft 45, the latter having a shoulder 46 formed thereon which abuts against one end of the ring 42. This ring when contracted is preferably held in place by a plurality of lugs 47 and the housing 48 of a reciprocable shaft 49 which controls the dog arm 44. This shaft housing 48 is preferably notched as shown at 50 to provide for the free movement of the ends of the dog arm 44 as the shaft 49 is reciprocated, the end of the arm 44 being operated by an inclined or beveled surface 51 on the shaft 49. This shaft or controlling rod is preferably relatively short and preferably ends as shown at 52 at the lower extremity of the incline surface 51 so that when the shaft is thrown rearwardly as by means of a cross arm 53 which also operates the controlling shaft 26' through a shipper connection therewith as is clearly shown in Fig. 4, the controlling rod 49 may be freely moved independent of the arm 44 and without actuating the latter. To prevent the end of the arm 44 from falling in front of the end 52 of the rod 49, a shoulder 54 is formed on the housing 48 at the inner edge of the slot 50 to stop the downward movement of the dog arm 44. The cross arm 53 which controls both of the clutches is operated by a single shipper yoke 55 connected to a shipper shaft 56 which may be operated by any means desired as by a handle, not shown herein.

From the foregoing, it will be clear that when the shipper shaft 56 is rotated rearwardly to throw the controlling shaft 26', which is preferably identical with the controlling shaft 26, in a rearward direction, the clutch elements 16', 17', and 19' corresponding to the clutch elements 16, 17, and 19 shown in Fig. 1 will be thrown into engagement and the reel will be operated and at the same time, the controlling rod 49 will be thrown rearwardly to release the dog arm 44 and permit the split ring 42 to contract. However, when the shipper shaft 56 is thrown in an opposite direction the lever mechanism which controls the driving clutch will be operated to release this clutch and the controlling arm 49 will be operated to expand the ring 42 into engagement with the inner periphery of the drum or with a suitable friction band 57. When the shipper shaft and the shipper yoke 55 carried thereby are in a neutral position, as shown in Figs. 3 and 4, neither the brake nor the clutch will be engaged and the drum may be freely rotated as by pulling on the cable which may be wound thereon.

It will be noted that by this improved construction I have provided a very simple, compact and easily operable rotating mechanism herein shown as applied to a drum to rotate the latter from a driving shaft although as is obvious, a belt wheel or other element to be rotated may be substituted for the drum 1. It will further be noted that the majority of the elements are carried within the drum 1, that the rotating parts are automatically lubricated, and that it is impossible through any manipulation of the single controlling arm to engage the drum with a braking element and with a driving element at the same time.

While I have in this application specifically described several embodiments which my invention may assume in practice, it is to be understood that these forms are used for illustrative purpose only and that the invention may be modified and embodied in various other forms without departing from its spirit or the scope of the appended claims.

What I claim as new and desire to secure by Letters Patent is:

1. In a reeling mechanism, a shaft, a reel drum closed at its ends and mounted on its shaft, clutch means within said drum whereby it may be clutched to said shaft, comprising a clutch element partially dividing the drum interior into two chambers arranged respectively adjacent opposite ends of the drum and clutch elements rotating with said shaft and arranged in each of said chambers, and means for operating said clutch means to cause clutching and releasing operation thereof, the entire interior of said drum constituting a lubricant reservoir.

2. In a reel, a hollow drum, a driving member, a drum braking member projecting into said drum, clutch members carried by said drum and driving member operative when mutually engaged to connect said drum to said driving member in driving relation, and means for controlling said braking member and for controlling said clutch members each movable in a direction longitudinally of the drum to effect control of the mechanism controlled thereby.

3. In a reel, a hollow drum, a driving member, a drum breaking member projecting into said drum, clutch members carried by said drum and driving member operative when mutually engaged to connect said drum to said driving member in driving relation, and means for controlling said braking member and for controlling said clutch members each movable in a direction longitudinally of the drum to effect control of the mechanism controlled thereby and having a common operating member.

4. In a reel, a hollow drum, a driving member, a drum braking member projecting into said drum, clutch members carried by said drum and driving member operative when mutually engaged to connect said drum to said driving member in driving relation, and means for controlling said braking member and for controlling said clutch members each comprising wedging means movable longitudinally of said drum to effect control of the mechanism controlled thereby.

5. In a reel, a hollow drum, a driving member, a drum braking member adapted to cooperate with said drum, clutch members carried by said drum and driving member operative when mutually engaged to connect said drum to said driving member in driving relation, and means for controlling said braking member and for controlling said clutch members including paralleled longitudinally movable operating shafts.

6. In a reel, a hollow drum, a driving member, a drum braking member adapted to cooperate with said drum, clutch members carried by said drum and driving member operative when mutually engaged to connect said drum to said driving member in driving relation, and means for controlling said braking member and for controlling said clutch members including parallel simultaneously longitudinally movable operating shafts.

7. In a reel, a hollow drum, a driving member, a drum braking member adapted to cooperate with said drum, clutch members carried by said drum and driving member operative when mutually engaged to connect said drum to said driving member in driving relation, and means for controlling said braking member and for controlling said clutch members including parallel longitudinally movable operating shafts one of which is coaxial with the drum.

8. In a reel, a hollow driving axle, a drum rotatably mounted thereon, clutch mechanism therebetween and within said drum, clutch controlling mechanism projecting into said hollow axle, braking mechanism for said drum, and means extending beyond the drum for controlling the braking mechanism.

9. In a reel, a driving axle, a drum rotatably mounted thereon, a plurality of clutch elements carried by said axle, controlling means therefor comprising a wedge actuated lever mechanism carried by said driving axle and rotatable therewith, and means for positively adjusting the position of said lever mechanism on said axle in either direction.

10. In a reel, a driving axle, a drum rotatably mounted thereon, a clutch element carried by said drum, an adjusting means mounted on said driving axle and adjustable longitudinally thereof, and a cooperating clutch element and clutch engaging means carried by said adjusting means.

11. In a reel, a driving axle, a drum rotatably mounted thereon, a clutch element carried by said drum, an adjusting means mounted on said driving axle and movable longitudinally thereof, a cooperating clutch element and clutch engaging means carried by said adjusting means, and means for normally retaining said clutch engaging means in an inoperative position.

12. In a reeling mechanism, a hollow driving axle, a drum rotatably mounted thereon, a clutch element carried by said drum, a clutch member mounted coaxially with said axle and slidable relative thereto but held against rotation with respect thereto, bell crank lever means oscillatable about pivots fixedly arranged with respect to said axle, said means engaging said clutch member and having portions projecting into the bore of said axle, and wedge means reciprocable in said bore for moving said lever means to cause engagement of said clutch member and element.

13. In a reel, a hollow driving axle, a drum rotatably mounted thereon, a clutch element carried thereby, a sleeve mounted coaxially on said driving axle for rotation therewith, means for adjusting the position of said sleeve on said axle, a lever carried by said sleeve, a cooperating clutch element carried by said sleeve and connected to said lever, and means extending into said hollow driving axle for controlling said lever.

14. In a reel, a hollow driving axle, a drum rotatably mounted thereon, a clutch element carried thereby, a sleeve mounted coaxially on said driving axle for rotation therewith, means for adjusting the position of said sleeve on said axle, a lever carried by said sleeve, a cooperating clutch element carried by said sleeve and connected to said lever, means extending into said hollow driving axle for controlling said lever, and means for normally retaining said lever in an inoperative position.

15. In a mechanism of the class described, a rotatable member, a stationary member projecting into said rotatable member, one of said members having an annular braking surface and the other a brake band secured thereto and having an operating lever rotatable on an axis extending parallel to the axis of said rotatable member, a member having a cylindrical bore arranged parallel to said axis and having a lateral slot opening into said bore, said operating lever extending into said slot, and a member having a cam surface thereon adapted to engage said lever and longitudinally slidable in said bore.

In testimony whereof I affix my signature.

HENRY H. MERCER.